(12) United States Patent
Nobe et al.

(10) Patent No.: US 6,741,820 B2
(45) Date of Patent: May 25, 2004

(54) IMAGE FORMING APPARATUS

(75) Inventors: Hiroshi Nobe, Nagoya (JP); Yoshikatsu Kameyama, Hashima-gun (JP); Takashi Ohama, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/076,501

(22) Filed: Feb. 19, 2002

(65) Prior Publication Data

US 2002/0114640 A1 Aug. 22, 2002

(30) Foreign Application Priority Data

Feb. 19, 2001 (JP) ........................ 2001-041660
Feb. 19, 2001 (JP) ........................ 2001-041661

(51) Int. Cl.[7] .............................................. G03G 15/00
(52) U.S. Cl. ........................................ 399/110; 399/125
(58) Field of Search ................................ 399/107, 110, 399/111, 113, 114, 125

(56) References Cited

U.S. PATENT DOCUMENTS

| 4,977,428 A | * | 12/1990 | Sakakura et al. | ............. 399/75 |
| 5,499,077 A | | 3/1996 | Endo et al. | ................... 399/27 |
| 5,506,665 A | | 4/1996 | Ishida et al. | ................ 399/119 |
| 5,557,368 A | | 9/1996 | Endo et al. | ................... 399/27 |
| 5,568,237 A | | 10/1996 | Ishida et al. | ................ 399/263 |
| 5,608,501 A | | 3/1997 | Makino | ...................... 399/119 |
| 5,630,198 A | | 5/1997 | Makino | ...................... 399/120 |
| 5,678,147 A | | 10/1997 | Makino | ...................... 399/263 |
| 5,697,014 A | | 12/1997 | Makino | ........................ 399/65 |
| 5,761,585 A | | 6/1998 | Makino | ...................... 399/262 |
| 5,771,427 A | | 6/1998 | Makino | ...................... 399/120 |
| 5,887,228 A | * | 3/1999 | Motohashi et al. | ......... 399/111 |
| 5,999,772 A | * | 12/1999 | Kakitani et al. | ............ 399/125 |
| 6,249,660 B1 | * | 6/2001 | Matsushita et al. | ......... 399/115 |

OTHER PUBLICATIONS

Brother—Overview, MFC–9100c, 6 in 1 Color Flatbed FC, Explain the possibilities . . . http//www.brother.com/usa/fax/info/mfc9100c/mfc9100c_ove.html.

* cited by examiner

Primary Examiner—Hoan Tran
(74) Attorney, Agent, or Firm—Oliff & Berridge, PLC

(57) ABSTRACT

An image forming apparatus includes a flat bed type image reading device, an upper body that includes the image reading device, an image forming device, a lower body that accommodates the image forming device and is disposed under the upper body, and a hinge member that connects the upper body and the lower body.

34 Claims, 13 Drawing Sheets

IMAGE FORMING APPARATUS

BACKGROUND OF THE INVENTION

1. Field of Invention

The invention relates to an image forming apparatus in which a flat bed type image scanner is disposed above a printer.

2. Description of Related Art

An image forming apparatus has long been well known, in which a flat bed type image scanner is disposed above a laser printer of electrophotography.

As shown in FIG. 14, in the image forming apparatus, a scanner unit 91 is disposed directly under an image scanner 90, and a cartridge 92 is installed under the scanner unit 91. The scanner unit 91 emits a laser beam to a photosensitive drum 93 mounted in the cartridge 92. A conveying mechanism 94 that conveys a recording medium (for example, a sheet of paper) is installed under the cartridge 92.

SUMMARY OF THE INVENTION

However, if a cartridge 92 needs replacing, then a cover 95 provided at a side of the image forming apparatus is opened, and the cartridge 92 is pulled out through a narrow space provided between the scanner unit 91 and the conveying mechanism 94. Replacement of the cartridge 91 is difficult at the narrow space, thereby deteriorating the workability.

The space between the scanner unit 91 and the conveying mechanism 94 can be widened enough by raising the position of the scanner 91. However, in this case, the scanner unit 91 is located at a further high position, and the image forming apparatus becomes tall by the amount the scanner unit 91 is elevated, thereby the image forming apparatus increases in size.

If a portion where the scanner unit 91 is disposed is structured so as to move up and down, the scanner unit 91 can be moved upward so as to widen the space provided between the scanner unit 91 and the conveying mechanism 94 only for replacement of the cartridge 92. However, with the movable structure, some mechanical play persists in a movable area. A positioning accuracy of the scanner unit 91 decreases due to the play in the movable area, a formation accuracy of an electrostatic latent image on the photosensitive drum 93 also decreases, and a quality of the image to be produced finally tends to be degraded.

The invention provides an image forming apparatus in which a flat bed type image scanner is disposed on a printer so as to make it easy to replace a cartridge without increasing the size of the apparatus.

According to one aspect of the invention, an image forming apparatus includes a flat bed type image reading device, an upper body that includes the image reading device, an image forming device, a lower body that accommodates the image forming device and is disposed under the upper body, and a hinge member that connects the upper body and the lower body. The flat bed type image reading device reads an image from an original document, as image data. To form the image on a recording medium, the image forming device includes a conveying unit that conveys the recording medium; a light emitting unit that emits a light according to the image data read by the image reading device or data externally input; a photosensitive member where an electrostatic latent image is formed by the light of the light emitting unit; a developing unit that develops the electrostatic latent image formed on the photosensitive member as a visible image; a transfer unit that transfers the visible image developed by the developing unit onto the recording medium; a fixing unit that fixes the visible image transferred onto the recording medium by the transfer unit; and a detachable cartridge that accommodates at least the photosensitive member. The upper body is pivoted about the hinge member between an open position where the upper body is opened with respect to the lower body and a close position where the upper body is closed with respect to the lower body. The light emitting unit is fixed to the lower body. The cartridge is disposed above the light emitting unit. The transfer unit is disposed above the photosensitive member accommodated in the cartridge. The cartridge is detachable from the lower body via a space provided between the upper body and the lower body by pivoting the upper body toward the open position.

BRIEF DESCRIPTION OF THE DRAWINGS

An embodiment of the invention will be described with reference to the following figures wherein.

DETAILED DESCRIPTION OF PREFERRED EMBODIMENTS

Figure 1:
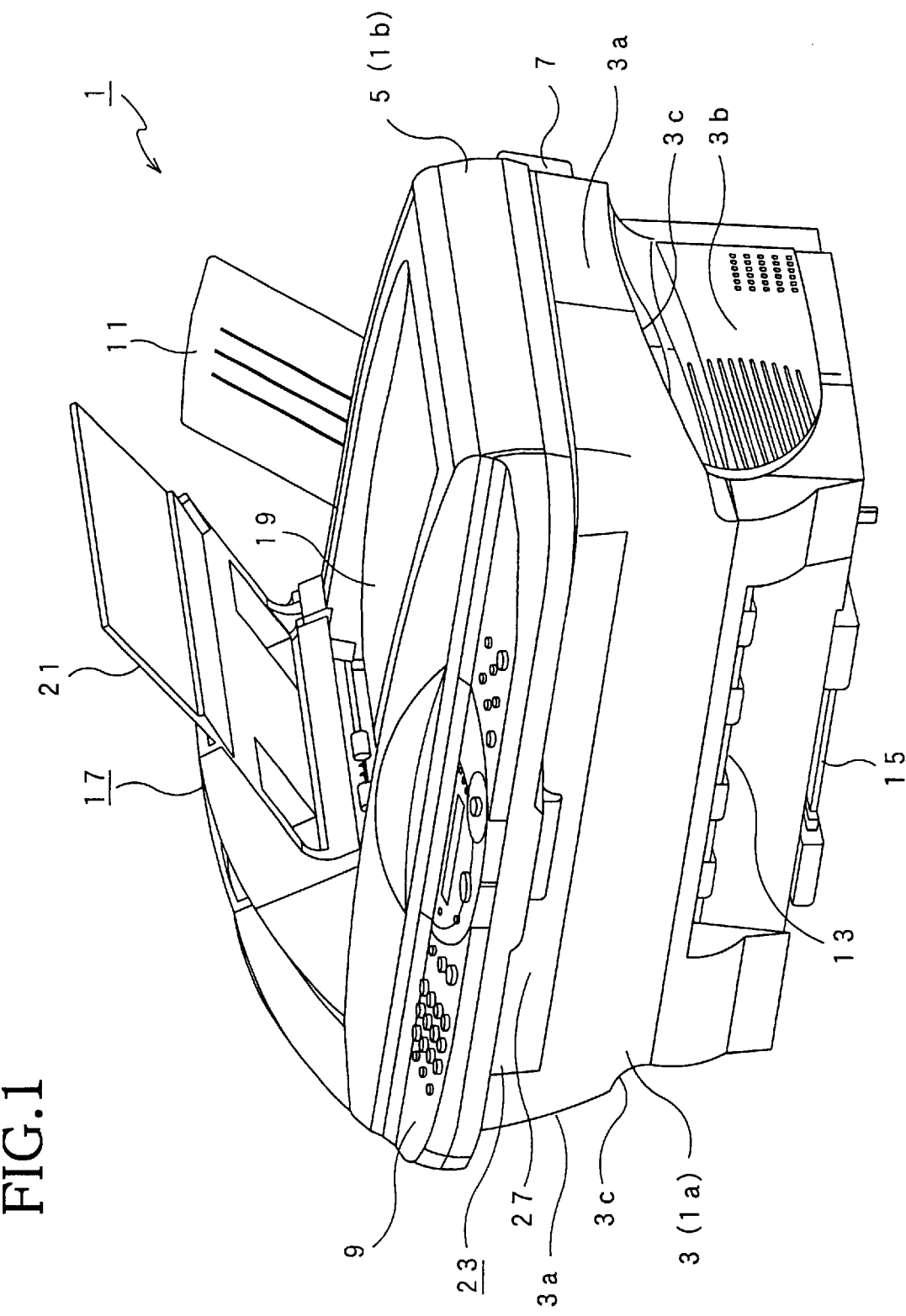
FIG. 1 is a perspective view of a laser printer according to an embodiment of the invention.

As shown in FIG. 1, a laser printer 1 with an image scanner (hereinafter called as the printer 1) includes a laser printing mechanism 1a mounted in a lower body 3 and an image scanner mechanism 1b mounted in an upper body 5.

Figure 2:
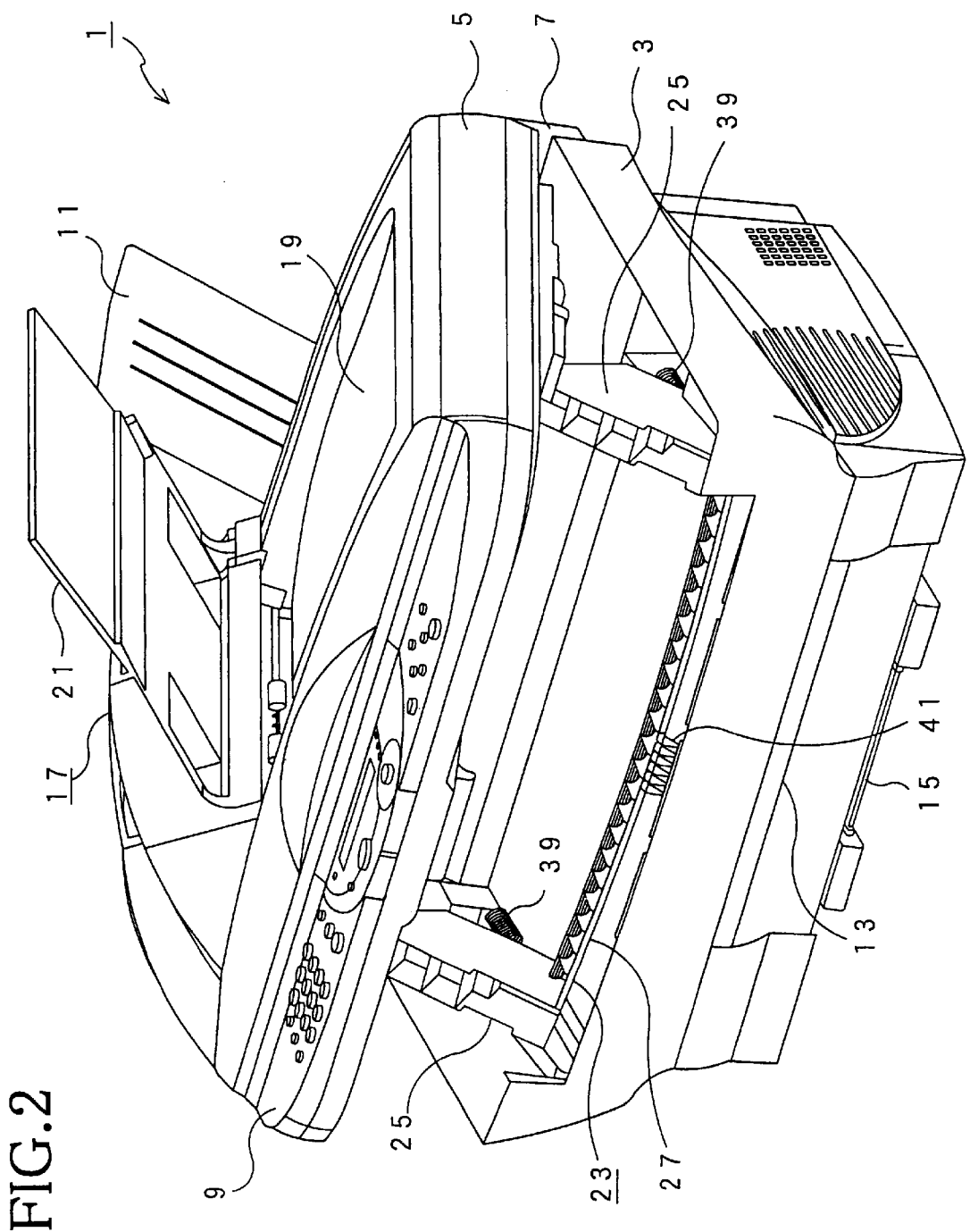
FIG. 2 is a perspective view of the laser printer when an upper body is in an open position.

The lower body 3 and the upper body 5 are connected by hinges 7 that are provided apart on the backside of the printer 1. When the upper body 5 is pivoted upward about the hinges 7 as a supporting point, the upper body 1 moves toward an open position as shown in FIG. 2. When the upper body 5 is pivoted downward about the hinges 7, the upper body 5 moves toward a close position as shown in FIG. 1. An operating panel 9 is provided at the front side of the printer 1.

The laser printing mechanism 1a is structured where an image is formed on a recording sheet supplied from a sheet tray 11 provided at the backside of the printer 1 and the recording sheet is ejected from a discharge portion 13 provided at the front side of the printer 1. A pullout discharge tray 15 is provided under the discharge portion 13 to receive recorded sheets discharged from the discharge portion 13.

The image scanner mechanism 1b is of a flat bed type and includes a line type image sensor that moves along a platen glass (not shown) to read an image from an document placed on the platen glass.

An automatic document feeder (hereinafter "ADF") unit 17 is provided at the left side of the upper body 5. The ADF unit 17 is structured to feed plural documents in order into the image scanner mechanism 1b to read images therefrom. While documents are supplied one by one from a document feeding tray 21 into the ADF unit 17, the image sensor becomes stationary and each document is sent over the image sensor to be scanned, so that image data can be obtained. Then the document is discharged from the ADF unit 17 and placed on a discharge tray 19.

In the laser printing mechanism 1a, recording sheets are fed in a direction from rear to front of the printer 1. In the image scanner mechanism 1b, the image sensor moves in a lengthwise direction from left to right of the printer 1. The two directions are arranged perpendicularly viewed from the top of the printer. An upper portion 3a of the lower body 3 protrudes outwardly from a lower portion 3b thereof and has the same size as the upper body 5 relative to a lengthwise moving direction of the image sensor. An impactive force to be generated when something comes into collision with the printer 1 is to be received by both the upper body 5 and the lower body 3. Thus, the image scanner mechanism 1b resists damage as compared with a structure where the upper body 5 only protrudes outwardly from the lower body 3. A stepped portion 3c is formed between the upper portion 3a and the lower portion 3b of the lower body 3 at each side. It is convenient to hold the printer 1 because the printer 1 can be supported manually from underneath at the stepped portion 3c. The sheet tray 11 is disposed in a position such that it does not conflict with the upper body 5 when the upper body 5 is pivoted upward about the hinges 7 as the supporting point. The sheet tray 11 does not interfere with replacement of the cartridge 61. Furthermore, the sheet tray 11 does not get damaged even if the upper body 5 is excessively pivoted toward the open position.

The hinges 7 are provided on the back of the lower body 3 and upper body 5 so as to protrude rearward, and placed on both sides of the sheet tray 11 so as not to interfere with the sheet tray 11. As the hinges 7 do not interfere with the sheet tray 11, the sheet tray 11 can be arranged inclined. By inclining the sheet tray 11, the convenience of operation for replenishing recording sheets into the sheet tray 11 can be increased.

As shown in FIG. 2, a movable member 23 is interposed between the lower body 3 and the upper body 5. The movable member 23 is movably connected to the lower body 3 and upper body 5.

Figure 3:
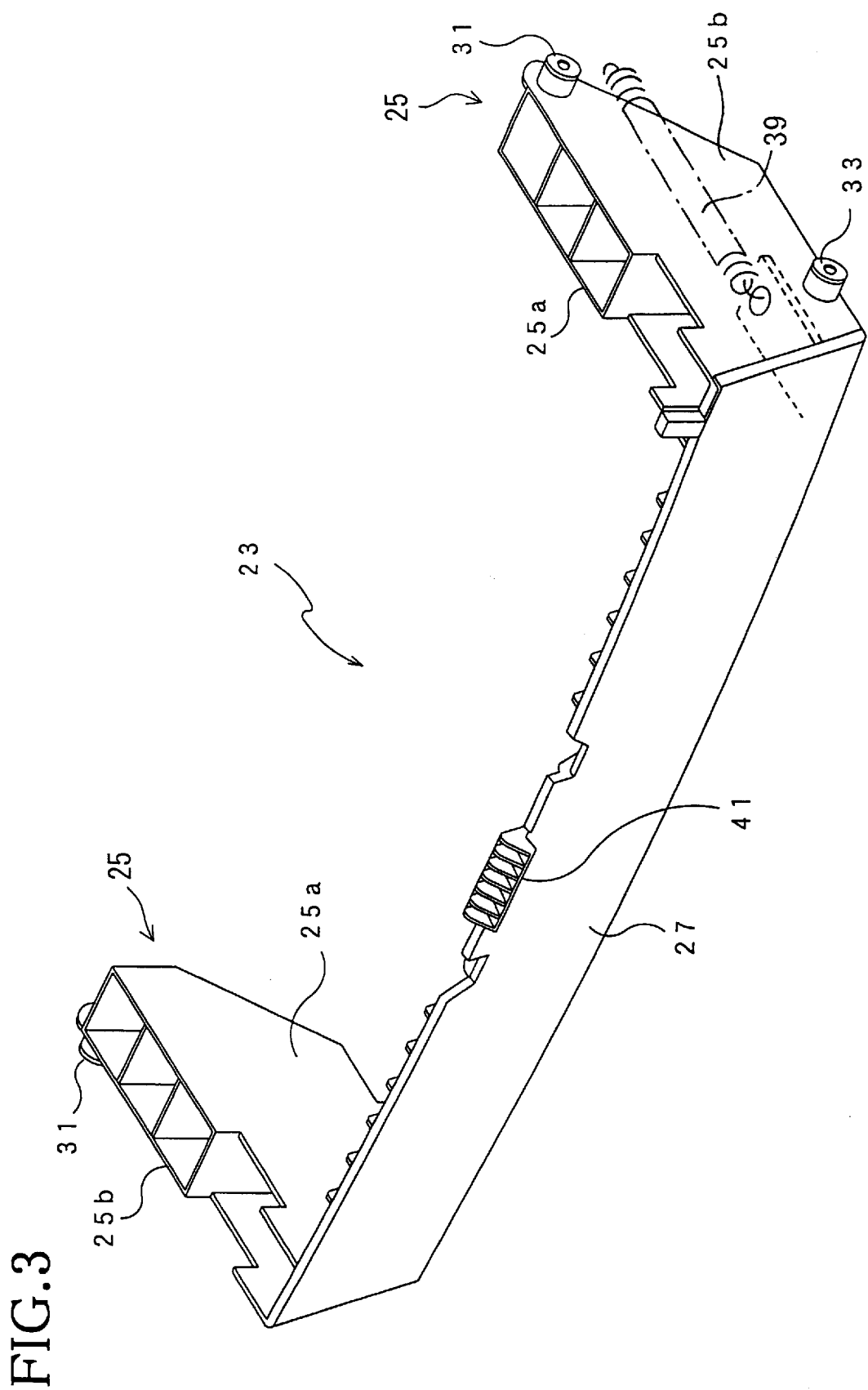
FIG. 3 is a perspective view of a movable member of the laser printer.

As shown in FIG. 3, the movable member 23 is provided with a pair of link members 25 and a bridge 27 bridging the link members 25, which are integrally formed into one body by molding. However, the movable member 23 can include only one link member 25 provided with or without a bridge 27.

Each of the link members 25 has a pair of walls 25a, 25b, which are formed parallel with each other. A cylindrical rotational shaft 31 and a cylindrical cam follower 33 are mounted on each wall 25b facing outward so as to protrude therefrom.

Figures 4A, 4B:
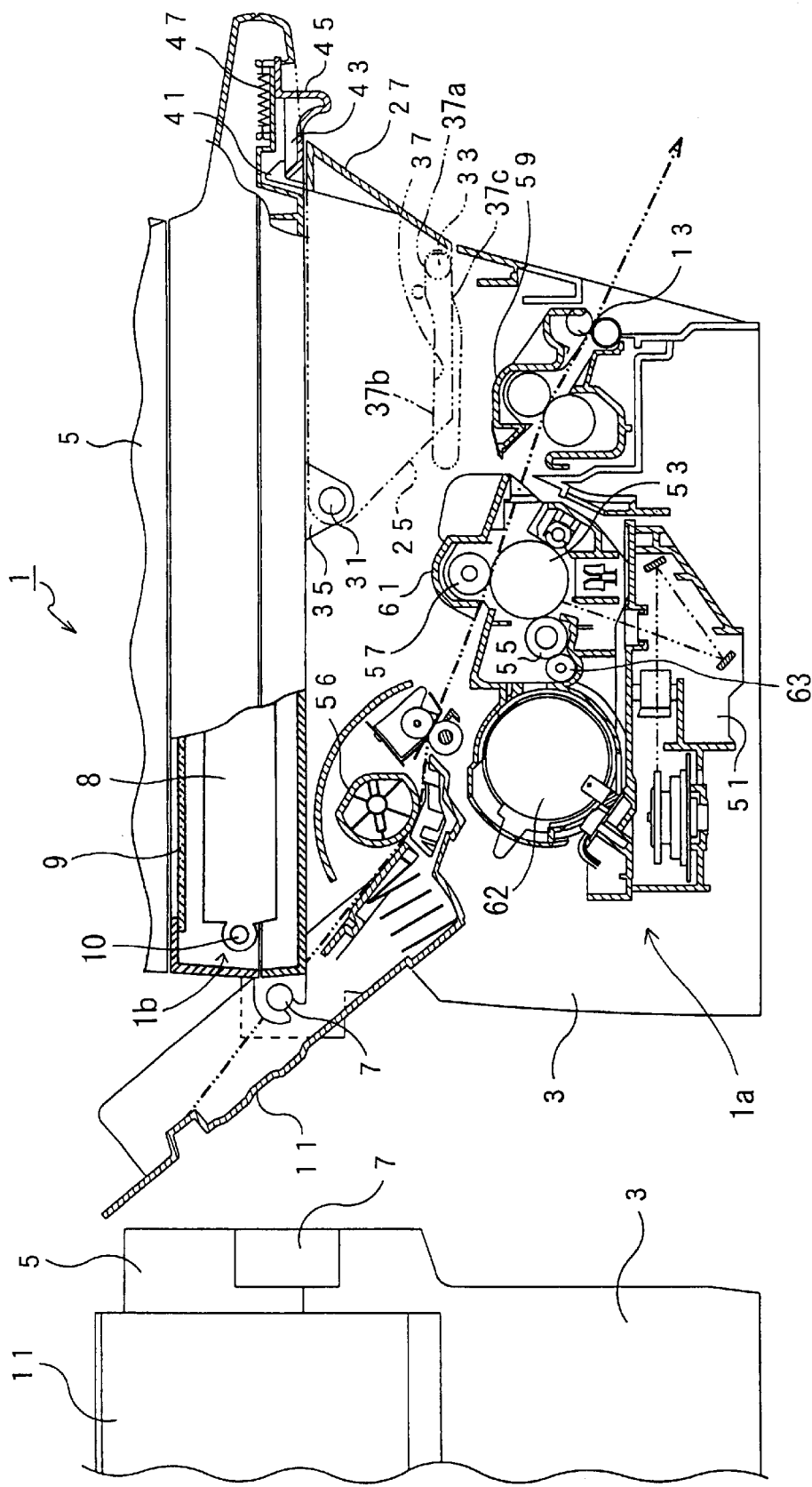
FIG. 4A is a partial rear view of the laser printer when the upper body is in a close position.
FIG. 4B a sectional view of the laser printer when the upper body is in the close position.

As shown in FIG. 4, the rotational shaft 31 is rotatably mounted to a bearing 35 of the upper body 5. The cam follower 33 is inserted into a cam groove 37 formed in the lower body 3. A spring 39 is connected to each link member 25 between the walls 25a, 25b. The walls 25a, 25b prevent the spring 39 from being touched. The spring 39 is stretched between the lower body 3 and each link member 25, and not connected to the upper body 5. Thus, the upper body 5 is not deformed by the action of the spring 39.

Figure 9:
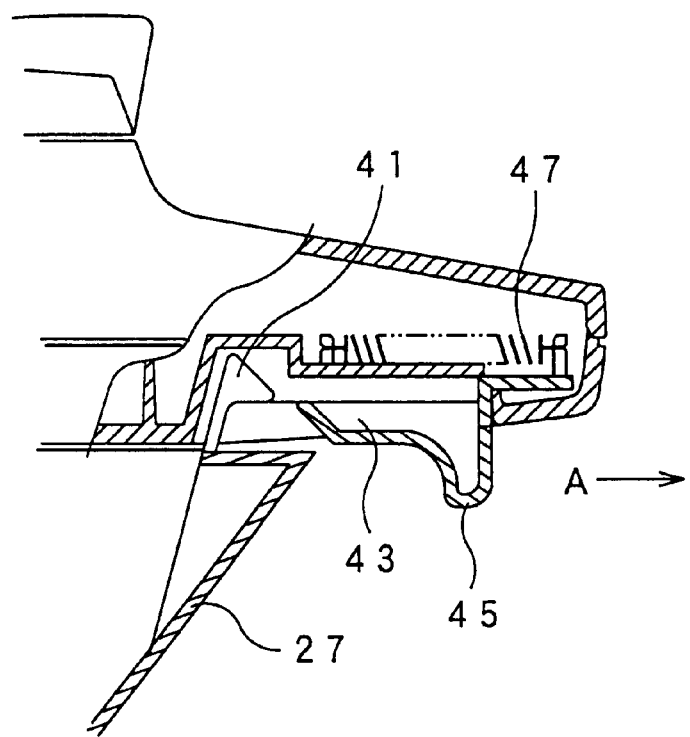
FIG. 9 is a partial sectional view of an engaging portion and an engaged portion of the laser printer.
Figure 10:
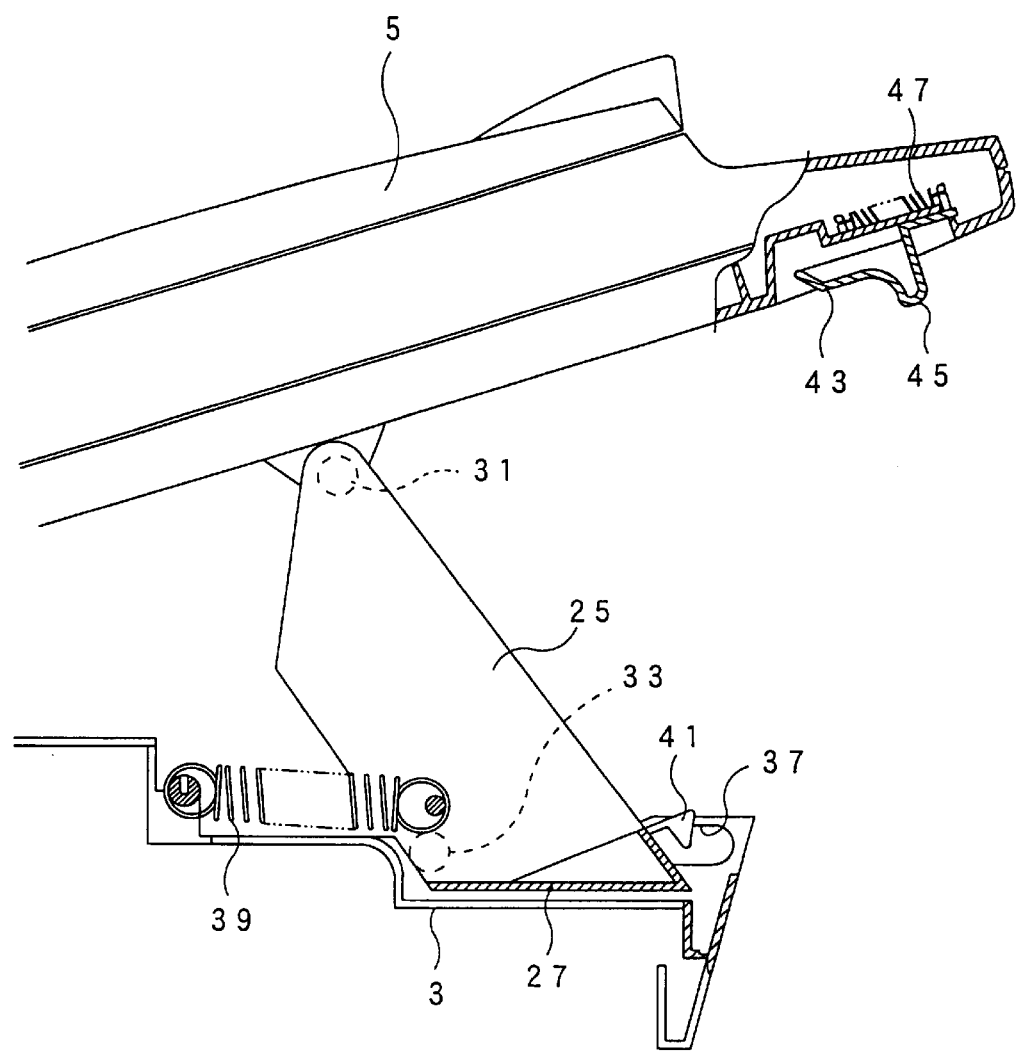
FIG. 10 is a sectional view of the link member and the spring of the laser printer when the upper body is in the open position.

As shown in FIGS. 1 and 4, the bridge 27 also serves as a part of exterior appearance when the upper body 5 is in the close position. The bridge 27 has a center-mounted engaged portion 41. The engaged portion 41 and the engaging portion 43 of the upper body 5 constitute a lock mechanism. When the engaging portion 43 engages with the engaged portion 41, the upper body 5 is locked with the lower body 3. An operating lever 45 is integrally formed with the engaging portion 43 by molding. When the operating lever 45 is pulled toward the front side of the printer 1 (in the direction of the arrow A in FIG. 9), the engagement between the engaging portion 43 and the engaged portion 41 is released to unlock the upper body 5. Thereby, when the upper body 5 is pulled upward, the upper body 5 is pivoted toward the open position as shown in FIG. 10. The engaging portion 43 and the operating lever 45 are normally urged in a direction to engage with the engaged portion 41 by a resilient force generated by the spring 47.

Figure 5:
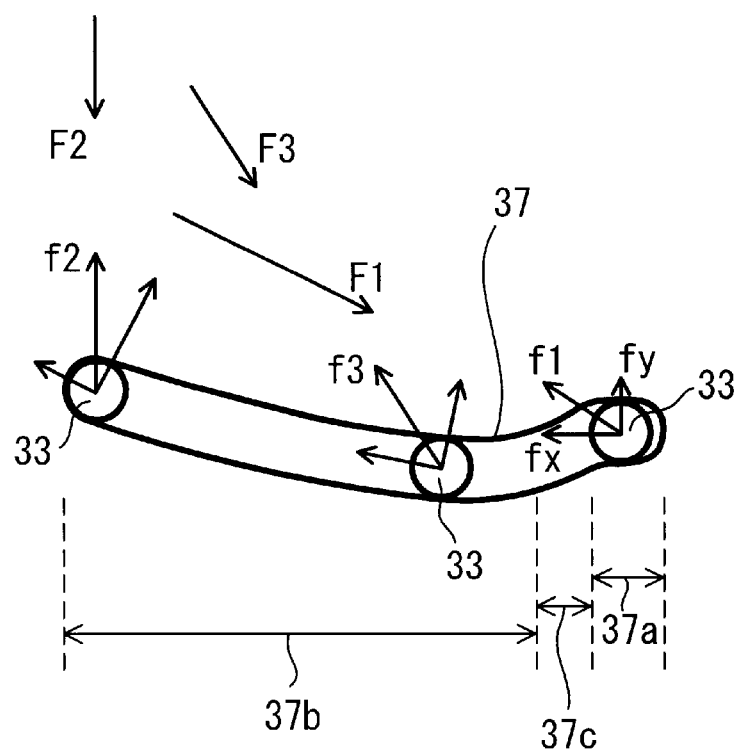
FIG. 5 is a schematic illustration of a cam groove of the laser printer according to the embodiment of the invention.

As shown in FIG. 5, the cam groove 37 has a first range 37a, a second range 37b, and a third range 37c. The first range 37a is provided to the front of the printer 1. In the first range 37a, a resultant moment acting on the upper body 5 is exerted in a direction to close the upper body 5. The second range 37b is provided to the rear of the printer 1. In the second range 37b, the resultant moment acting on the upper body 5 is exerted in a direction to open the upper body, contrary to the first range 37a. The third range 37c is provided in a position continuously connecting the first range 37a and the second range 37b. In the third range 37c, a direction of the resultant moment acting on the upper body 5 is gradually changed.

A force F produced by the weight of the upper body 5 acts on the rotational shaft 31. The force F imposed on the rotational shaft 31 acts on the cam groove 37 via the link member 25 and the cam follower 33. A force f is a resultant force of a force fx, which is a load of the spring 39, and a force fy, which is a resistance acting vertically, generated at a contact point between the cam follower 33 and the cam groove 37. As the link member 25 is urged in a specific direction by the spring 39, the force f acts on the cam groove 37 via the cam follower 33.

The force F varies into force F1, F2, or F3 according to the following rotational positions of the upper body 5. The force F1 is generated when the upper body 5 is closed, the force F2 is generated when the upper body 5 is opened, and the force F3 is generated when the upper body 5 is at the midpoint position. The force f, the resultant of forces fx and fy, varies into force f1, f2, or f3 at the respective rotational positions of the upper body 5.

The forces f1, f2, f3 are associated with the first range 37a, the second range 37b, and the third range 37c, respectively. As described above, in the first range 37a, the resultant moment acting on the upper body 5 acts in the direction to close the upper body 5. The first range 37a is determined in such a manner to set the force F1 greater than the force f1. Thereby, the moment is generated in the direction to close the upper body 5.

In the second range 37b, the moment acts in the direction to open the upper body 5. Therefore, the second range 37b is determined in such a manner to set forces f2, f3 greater than forces F2, F3. Thereby, the moment is produced in the direction to open the upper body 5.

When the upper body 5 is pivoted from the close position toward the open position so that the cam follower 33 reaches the second range 37b in the cam groove 37, the moment to pivot the upper body 5 toward the open position is generated. The upper body 5 is pivoted toward the open position, the cam follower 33 abuts against an end of the cam groove 37, and the upper body 5 comes to rest. Thus, the upper body 5 can be kept at the open position without the need to be supported by a user, facilitating jobs performed in a space between the upper body 5 and the lower body 3, such as repairing and adjustment of the printer 1 and replacement of the cartridge 61.

When the upper body 5 is pivoted toward the close position so that the cam follower 33 reaches the first range 37a in the cam groove 37, the moment to pivot the upper body 5 toward the close position is exerted. Thus, the upper body 5 pivots toward the close position under its own weight. Therefore, there is no need to apply an excessive strength so as to close the upper body 5.

Figure 6:
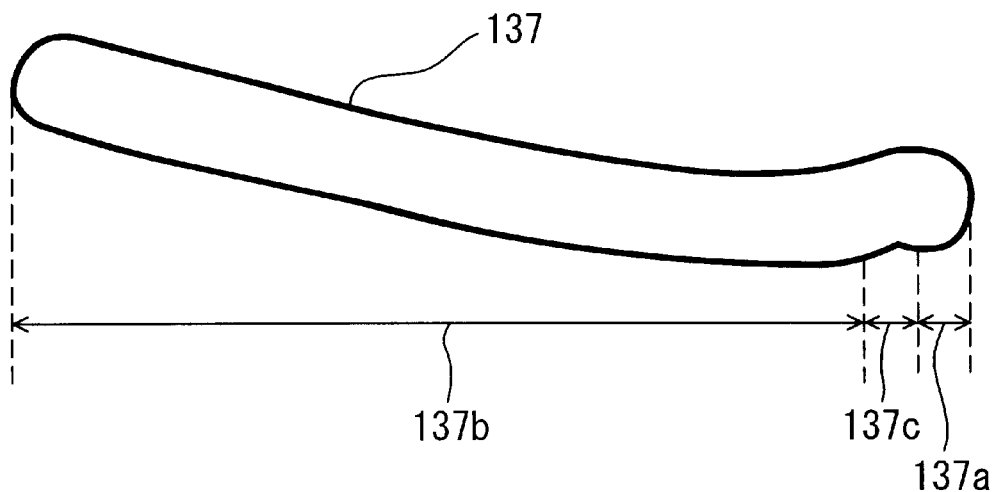
FIG. 6 is a schematic illustration of a cam groove of the laser printer according to another embodiment of the invention.

Another cam groove 137 is shown in FIG. 6. The cam groove 137 has a first range 137a, a second range 137b, and a third range 137c. The first range 137a is provided to the front of the printer 1. In the first range 137a, the resultant moment acting on the upper body 5 is exerted in a direction to close the upper body 5. The second range 137b is provided to the rear of the printer 1. In the second range 137b, a balance between the force F and the force f is achieved. The third range 137c is provided in a position continuously connecting the first range 137a and the second range 137b. In the third range 137c, the moment acting on the upper body 5 is changed from the direction to close the upper body 5 to the direction to keep the balance.

As long as the cam follower 33 is within the second range 137b in the cam groove 137, the upper body 5 is held still at a specified position.

Thereby, the upper body 5 can be prevented from pivoting toward the open position spontaneously. It is convenient when the upper body 5 can not be completely pivoted to the open position, for example, because the printer 1 is used where space is limited.

Figure 7:
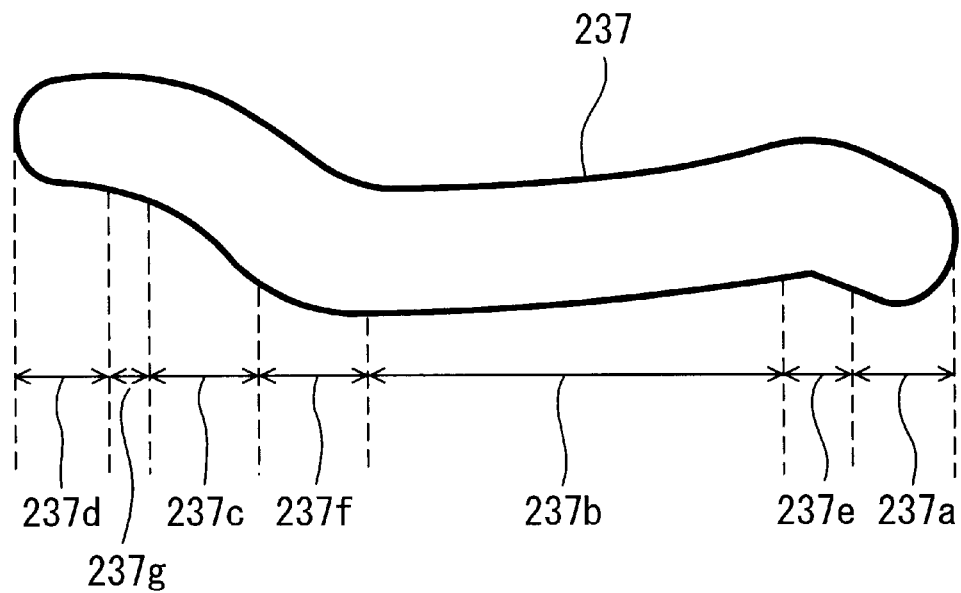
FIG. 7 is a schematic illustration of a cam groove of the laser printer according to other embodiment.
Figure 8:
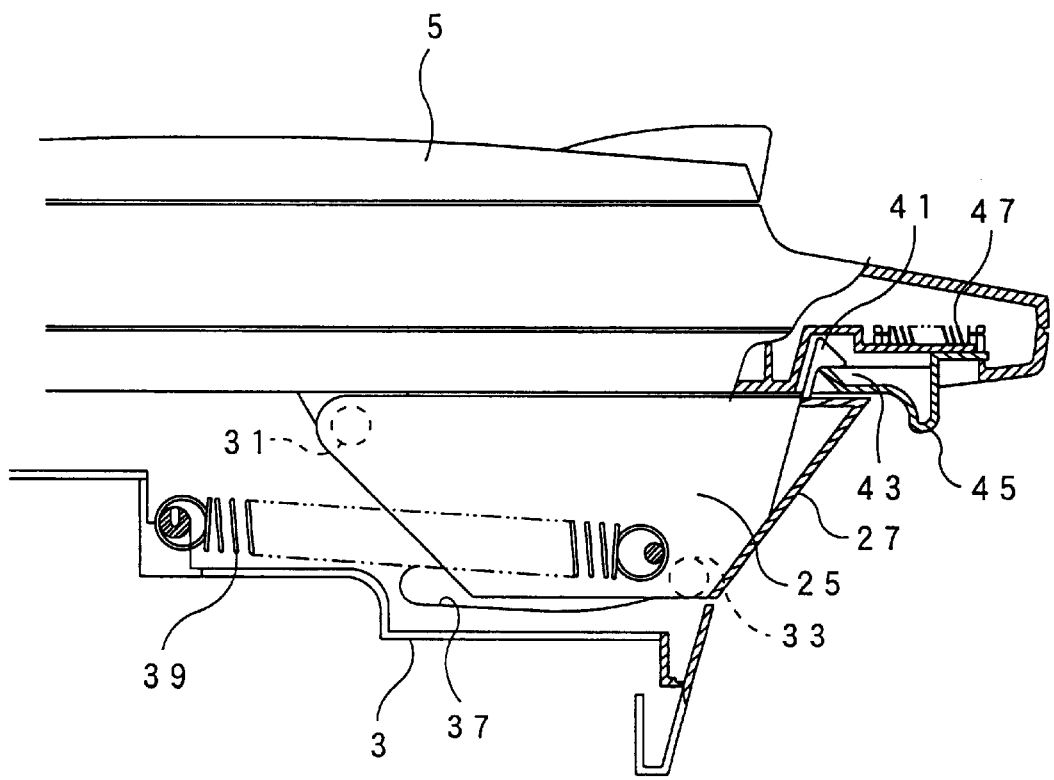
FIG. 8 is a partial sectional view of a link member and a spring of the laser printer when the upper body is in the close position.

Further, another cam groove 237 is shown in FIG. 7. The cam groove 237 includes a first range 237a, a second range 237b, a third range 237c, a fourth range 237d, a fifth range 237e, a sixth range 237f, and a seventh range 237g. The first range 237a is provided to the front of the printer 1, where the moment acting on the upper body 5 is exerted in the direction to close the upper body 5. In the second range 237b, the moment acting on the upper body 5 acts in the direction to open the upper body 5. In the third range 237c, the moment acting on the upper body 5 acts in the direction to close the upper body 5. In the fourth range 237d, the moment acting on the upper body 5 acts in the direction to open the upper body 5. The fifth range 237e is provided in a position continuously connecting the first range 237a and the second range 237b, where the direction of the moment acting on the upper body 5 is changed. The sixth range 237f is provided in a position continuously connecting the second range 237b and the third range 237c, where the moment acting on the upper body 5 is not produced. The seventh range 237g is provided in a position continuously connecting the third range 237c and the fourth range 237d, where the direction of the moment acting on the upper body 5 is changed.

When the upper body 5 is pivoted from the close position toward the open position so that the cam follower 33 reaches the second range 237b in the cam groove 237, the moment to pivot the upper body 5 toward the open position is exerted. When the upper body 5 is further pivoted toward the open position, the cam follower 33 reaches the sixth range 237f, and the upper body 5 comes to rest. When the upper body 5 is further pivoted toward the open position against the moment acting on the upper body 5 while the cam follower 33 is in the third range 237c, the moment to pivot the upper body 5 toward the open position is exerted in the fourth range 237d. Thereby, the cam follower 33 abuts against an end portion of the cam groove 237 and the upper body 5 comes to rest.

When the upper body 5 is pivoted toward the close position so that the cam follower 33 reaches the third range 237c in the cam groove 237, the moment to pivot the upper body 5 toward the close position is exerted. Thereby the upper body 5 pivots by its own weight, the cam follower 33 is moved in the sixth range 237f, and the upper body 5 comes to rest.

Because the upper body 5 is held still while the cam follower 33 is in the sixth range 237f, the upper body 5 can be prevented from pivoting toward the open position spontaneously. It is convenient when the upper body 5 can not be completely pivoted to the open position, for example, because the printer 1 is used where space is limited.

If the cam follower 33 is moved to the second range 237b from this state, the moment acts on the upper body 5 toward the open position, so that the force f normally acts in the direction to return the cam follower 33 to the sixth range 237f. When the upper body 5 is further pivoted toward the close position so that the cam follower 33 moves over the fifth range 237e, the upper body 5 pivots to the close position by its own weight.

As shown in FIG. 4, the image scanner mechanism 1b is of flat bed type and is accommodated in the upper body 5. The image scanner mechanism 1b includes the line type image sensor 8, which is movably mounted on a rail 10. The line type image sensor 8 moves along the platen glass 9 and reads image from a document placed on the platen glass 9.

The laser printing mechanism 1a has a scanner unit 51, a photosensitive drum 53, a developing roller 55, a toner cartridge 62, a toner supply roller 63, the sheet roller 56, a transfer roller 57 and a fixing unit 59. The scanner unit 51 emits a laser beam in accordance with the image data read by the image scanner mechanism 1b or input from outside to form an electrostatic latent image on the photosensitive drum 53. A toner accommodated in the toner cartridge 62 is supplied to the developing roller 55 via the toner supply roller 63. When the developing roller 55 supplies the toner to the surface of the photosensitive drum 53, the electrostatic latent image on the photosensitive drum 53 is developed as a toner image or a visible image. At this time, the toner is adhered on a charged part of the photosensitive drum 53 where the latent image is formed. The toner is not adhered on a part that does not become charged. The transfer roller 57 presses a recording sheet, which is supplied from the sheet tray 11 and fed by the sheet roller 56, against the photosensitive drum 53. The voltage is applied to the transfer roller 57 to attract the toner toward the recording sheet, and the toner image on the photosensitive drum 53 is transferred onto the recording sheet. The fixing unit 59 applies heat to the toner image transferred onto the recording sheet to fix the image onto the recording sheet.

The sheet roller 56, the photosensitive drum 53, the transfer roller 57, and rollers in the fixing unit 59 constitute a conveying mechanism that feeds the recording sheets from the sheet tray 11 to the discharge portion 13. A paper feed path by the conveying mechanism is straight (shown by a thick double dotted line in FIG. 4B) such that each of the recording sheets is always fed with a recorded surface thereof facedown. Therefore, the orientation of the recorded surface of the sheet remains unchanged in the paper feed path, which prevents the recording sheets from curling.

The scanner unit 51 and the photosensitive drum 53 are disposed under the paper feed path. As the image is formed on the recorded surface of the recording sheet facedown, the sheet is discharged from the printer 1 without causing the recording sheet to make a U-turn. The recording sheets are discharged facedown in the order of recording, and the order of pages is not reversed.

Figure 11:
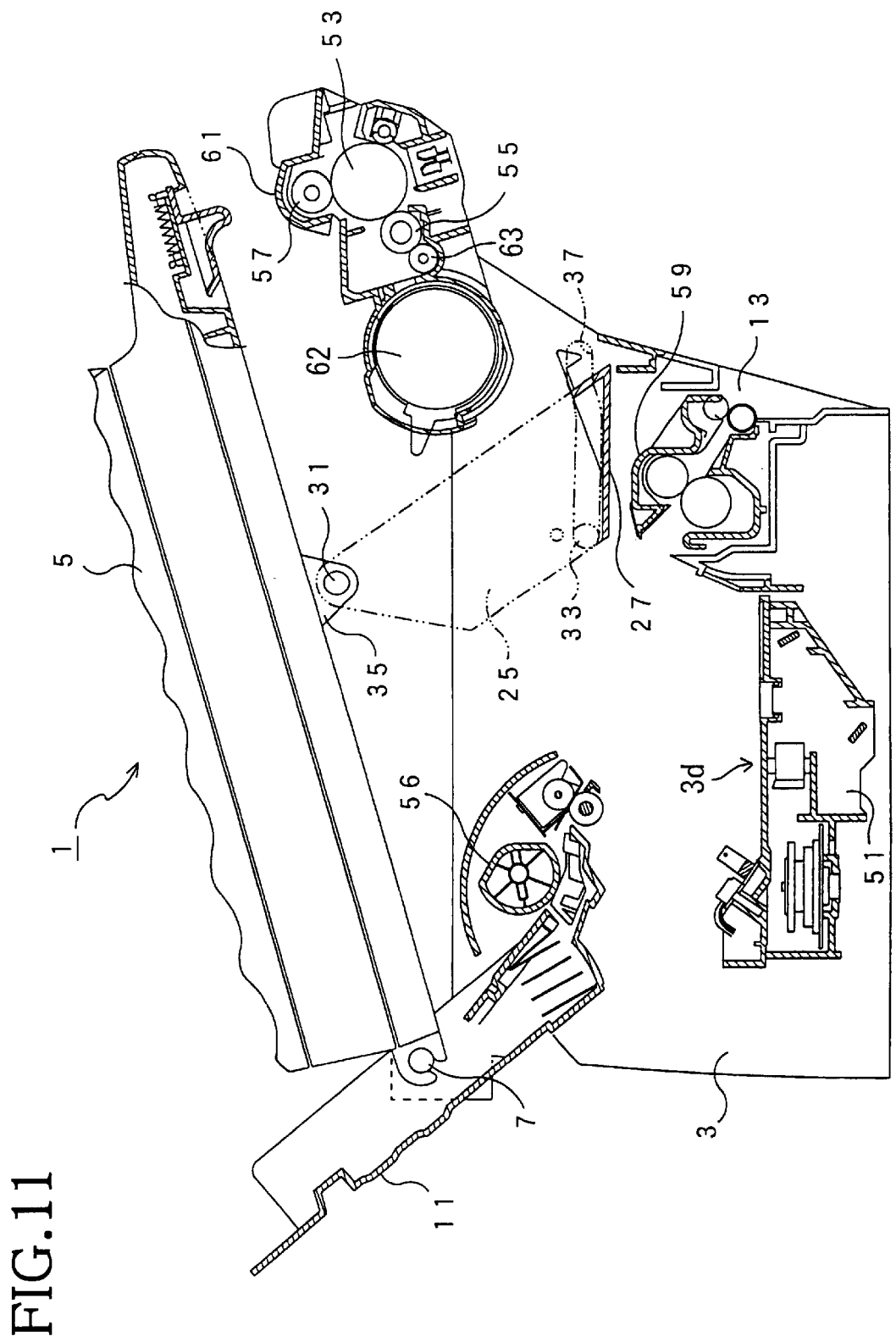
FIG. 11 is a sectional view of the laser printer when the upper body is in the open position.

The photosensitive drum 53, the developing roller 55, the transfer roller 57, the toner cartridge 62, and the toner supply roller 63 are mounted in a cartridge 61 as shown in FIG. 11. The cartridge 61 is removable from the lower body 3 when the upper body 5 is pivoted to the open position. The lower body 3 includes a recessed portion 3d to fit the bottom surface of the cartridge 61. When the cartridge 61 is inserted into the lower body 3, the cartridge 61 fits in the recessed portion 3d in position by its own weight.

The bridge 27 moves to cover the fixing unit 59 when the upper body 5 is pivoted to the open position. This prevents a user from touching the heated fixing unit 59 by mistake during replacement of the cartridge 61.

Figure 13:
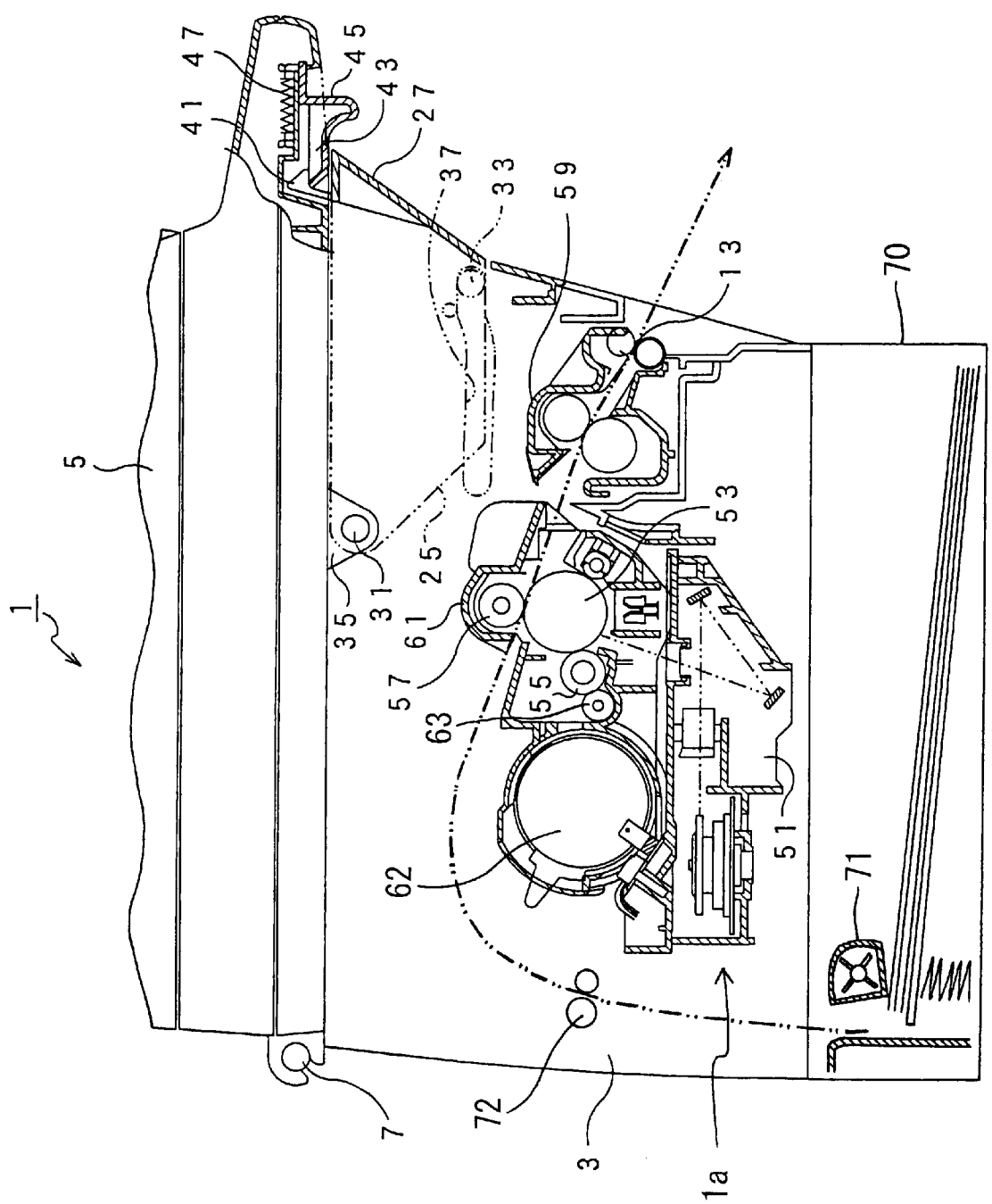
FIG. 13 is a sectional view of a laser printer when an upper body is in a close position according to another embodiment.
Figure 14:
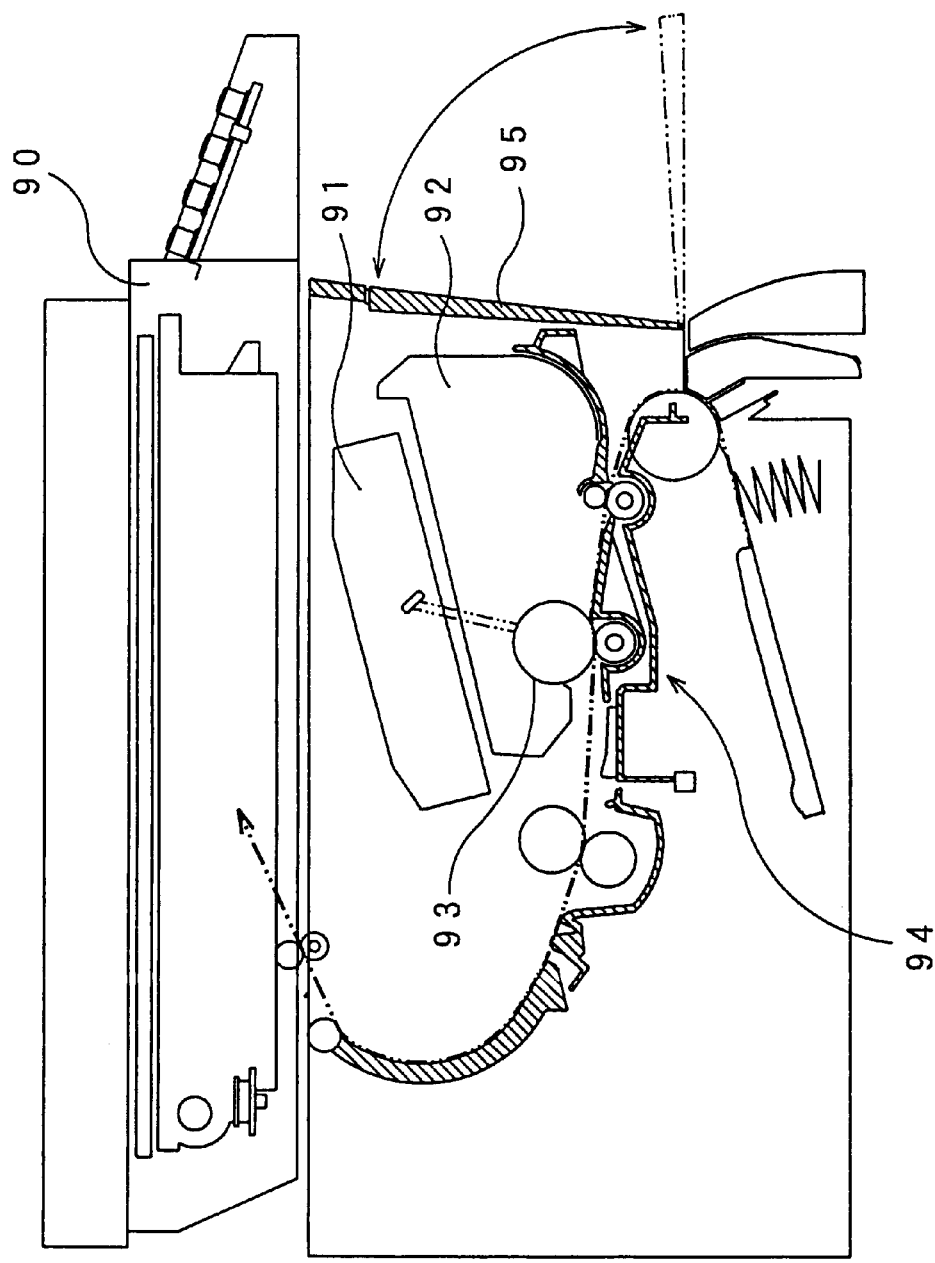
FIG. 14 is a sectional view of a conventional laser printer.

FIG. 13 shows another conveying mechanism. In this example, a sheet tray 70 is disposed on the bottom of the lower body 3, and recording sheets are fed to the laser printing mechanism 1a via sheet rollers 71, 72. In a paper feeding path by the conveying mechanism also, each of the recording sheets is always fed with a recorded surface thereof facedown.

According to the printer 1 structured as described above, when the upper body 5 including the image scanner mechanism 1b is pivoted toward the open position, the upper body 5 and the lower body 3 are unlocked to provide a wide space so that the cartridge 61 can be detached from the printer 1 via the wide space. Thus, the convenience in replacement of the cartridge 61 can be increased. In particular, the printer 1 offers an advantage in that, when the upper body is pivoted to the open position, the bridge 27 (the movable member 23) moves downward. Compared with a structure where the upper body 5 only is pivoted to the open position, a space between the bridge 27 and the upper body 5 is further enlarged, thereby improving the convenience of the operation implemented with the upper body 5 in the open position.

The height of the printer 1 becomes small with the upper body 5 in the close position. Because the printer 1 does not allocate a space for replacement of the cartridge 61, the printer 1 does not increase in size.

As the scanner unit 51 is fixed to the lower body 3, an accuracy of an installation position of the scanner unit 51 can be assured although the upper body 5 is movable.

As the two link members 25 are disposed apart from each other, they support the upper body 5 at many points, comparing with a structure where only one link member is disposed. Thus, the stability increases when the upper body 5 is open. In addition, as the bridge 27 is connected between the link members 25, the rotational angle of the link members 25 is always kept in alignment, and the upper body 5 resists torsional stress. As the link members 25 synchronically move, the movement of the upper body 5 can be smooth comparing with a structure where link members operate separately.

In the printer 1, the operating lever 45, which is used for disengagement between the engaging portion 43 and the engaged portion 41, is provided with the upper body 5. When the upper body 5 is manually held and pivoted to the open position by a user, the operating lever 45 enables the disengagement and opening of the upper body 5 to be done at the same place and in one step.

The image scanner mechanism 1b is of a flat bed type and includes the image sensor that moves along a document to read an image therefrom. As the image scanner mechanism 1b is mounted in the upper body 5 that is less prone to being deformed, reading accuracy of the flat bed-type image scanner can be properly kept.

The spring 39 is disposed so as to expand as the upper body 5 is pivoted to the close position in the printer 1. However, as long as the cam follower 33 can be urged toward the rear of the printer 1, the spring 39 may be disposed to be compressed as the upper body 5 is pivoted to the close position, according to the positional relationship between the link member 25 and the spring 39.

Figure 12A:
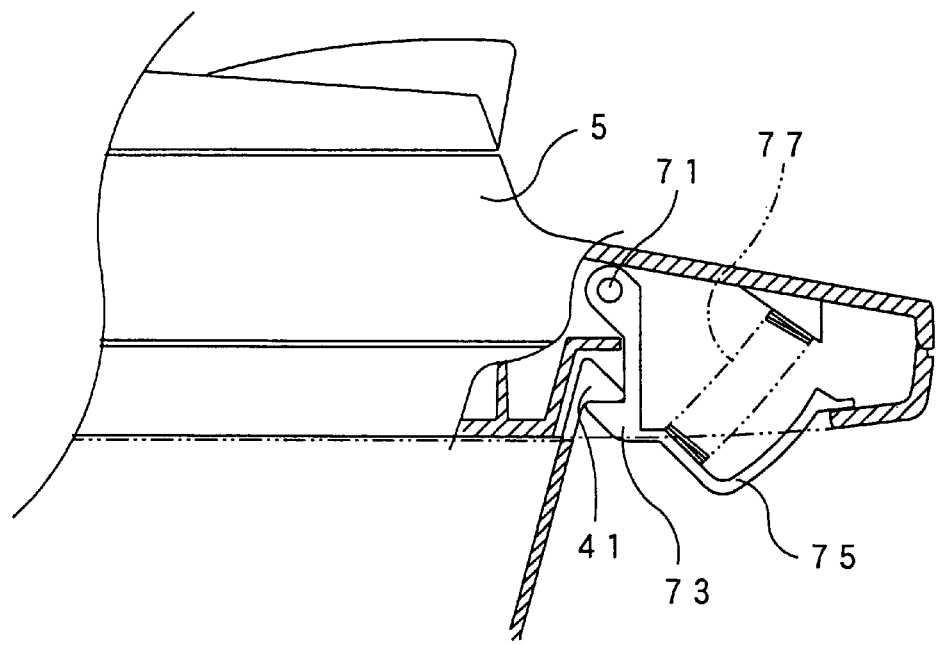
FIG. 12A is a partial sectional view of an engaging portion according to another embodiment.
Figure 12B:
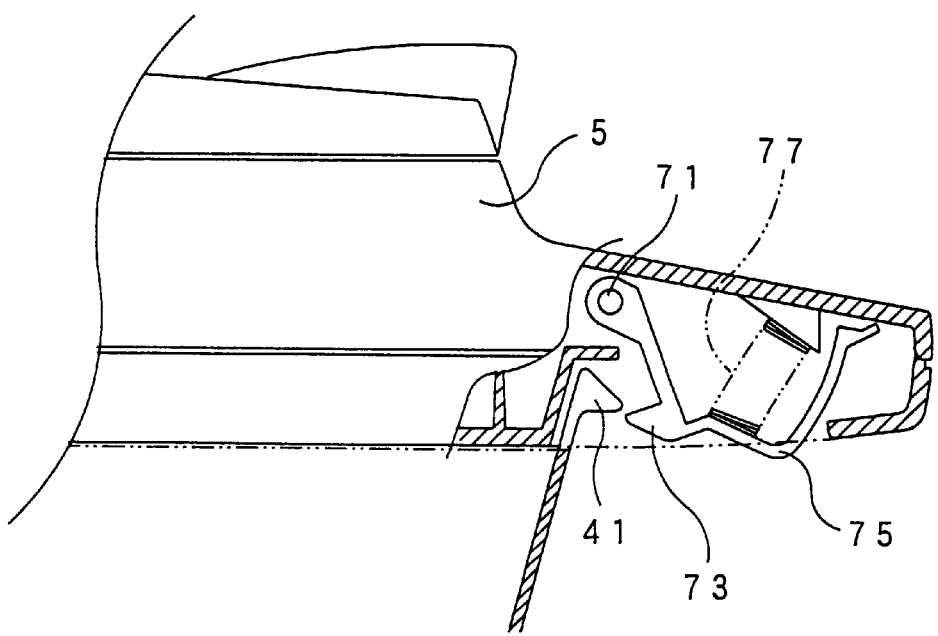
FIG. 12B is a partial sectional view of an engaging portion according to other embodiment.

According to the printer 1, when the operating lever 45 is horizontally slid, the engagement between the engaged portion 41 and the engaging portion 43 is released. Instead, as shown in FIGS. 12A and 12B, an engaging portion 73 and an operating lever 75 that pivot around a shaft 71, and a spring 77 may be provided. With this structure, the engagement between the engaged portion 41 and the engaging portion 73 can be released by pivoting the operating lever 75 against a load of the spring 77.

In the printer 1, the bridge 27 serves as a cover of the fixing unit 59 that is to heat up. If the fixing unit 59 becomes unnecessary because an ink jet type image scanner portion is adopted, for example, the bridge 27 does not need to function as the cover.

In the printer 1, the bridge 27 (the movable member 23) is moved at a position to cover the fixing unit 59. With the adoption of a cover dedicated to the fixing unit, the movable member 23 does not need moving to the position to cover the fixing unit.

If the structure of moving the upper body 5 to the open position suffices, the printer 1 may not include the above-described movable member.

The printer 1 is provided with the scanner unit 51 that emits a laser beam, however, may be structured where a light emitting head including light emitting diodes in line is used to emit the light onto a photo conductor.

The cam groove 37, 137, 237 is formed in the lower body 3, however, a printer 1 may be provided with a guide member with a cam groove.

While the invention has been described with reference to specific embodiments, the description of the embodiments are illustrative only and are not to be construed as limiting the scope of the invention. Various other modifications and changes may occur to those skilled in the art without departing from the spirit and scope of the invention.

What is claimed is:

1. An image forming apparatus, comprising:
   a flat bed type image reading device reads an image from an original document, as image data;
   an upper body that includes the image reading device;
   an image forming device, comprising:
      a conveying unit that conveys a recording medium;
      a light emitting unit that emits a light according to the image data read by the image reading device or data externally input;
      a photosensitive member where an electrostatic latent image is formed by the light of the light emitting unit;
      a developing unit that develops the electrostatic latent image formed on the photosensitive member as a visible image;
      a transfer unit that transfers the visible image developed by the developing unit onto the recording medium;
      a fixing unit that fixes the visible image transferred onto the recording medium by the transfer unit; and
      a detachable cartridge that accommodates at least the photosensitive member;
   a lower body that accommodates the image forming device and is disposed under the upper body; and
   a hinge member that connects the upper body and the lower body, the upper body being pivoted about the hinge member between an open position where the upper body is open with respect to the lower body and a close position where the upper body is closed with respect to the lower body, wherein the transfer unit is disposed above the photosensitive member accommodated in the cartridge, the cartridge is detachable from the lower body via a space provided between the upper body and the lower body by pivoting the upper body toward the open position, and the lower body is divided into an upper part and a lower part, the upper part has the same size as the upper body as to a lengthwise direction, a stepping portion is formed between the upper part and the lower part of the lower body, and the lower part is shorter than the upper part as to the lengthwise direction.

2. The image forming apparatus according to claim 1, wherein the hinge member is provided at one side of the upper body and the lower body so that the cartridge is detachable from a side opposite to the one side.

3. The image forming apparatus according to claim 2, further comprising a movable member that is provided in the side opposite to the one side where the hinge member is provided, the movable member moving together with the upper body, wherein when the upper body is pivoted toward the open position, the movable member moves downward to provide a space between the upper body and the movable member, and when the upper body is pivoted toward the close position, the movable member moves in between the upper body and the lower body and covers the space.

4. The image forming apparatus according to claim 3, wherein when the upper body is pivoted toward the open position, the movable member moves in a position to cover the fixing unit.

5. The image forming apparatus according to claim 1, wherein the light emitting unit is fixed to the lower body and the cartridge is disposed above the light emitting unit.

6. The image forming apparatus according to claim 1, wherein the original document is placed parallel to the upper body as to the lengthwise direction, and the recording medium is placed perpendicularly to the upper body as to the lengthwise direction.

7. The image forming apparatus according to claim 1, wherein the light emitting unit is fixed to the lower body and includes a recess at an upper portion thereof and the cartridge is placed in an appropriate position within the recess.

8. The image forming apparatus according to claim 1, wherein the cartridge accommodates the transfer unit.

9. The image forming apparatus according to claim 1, wherein the cartridge accommodates the developing unit.

10. The image forming apparatus according to claim 1, further comprising a recording medium supplying unit that supplies the recording medium, wherein the recording medium supplying unit is disposed under the light emitting unit, and the conveying unit conveys the recording medium from the recording medium supplying unit to the photosensitive member and the transfer unit.

11. The image forming apparatus according to claim 1, further comprising a recording medium supplying unit that supplies the recording medium, wherein the recording medium supplying unit is disposed above the light emitting unit, and the conveying unit conveys the recording medium from the recording medium supplying unit to the photosensitive member and the transfer unit.

12. The image forming apparatus according to claim 11, wherein the recording medium supplying unit is disposed on the one side where the hinge member is provided, and the hinge member comprises two hinge members, which are disposed on both ends of the recording medium supplying unit so as not to interfere with the recording medium supplying unit.

13. An image forming apparatus, comprising:
   a flat bed type image reading device;
   an upper body that includes the image reading device;
   an image forming device that includes a detachable cartridge that accommodates at least a photosensitive member;
   a lower body that accommodates the image forming device and is disposed under the upper body;
   a hinge member that connects the upper body and the lower body, the upper body being pivoted about the hinge member between an open position where the upper body is open with respect to the lower body and a close position where the upper body is closed with respect to the lower body; and
   a movable member that is provided in a side of the upper body and the lower body opposite to one side of the upper body and the lower body where the hinge member is provided, wherein the movable member moves together with the upper body, wherein when the upper body is pivoted towards the open position, the movable member moves downward to provide a space between the upper body and the movable member to allow the detachable cartridge to move in and out of the lower body.

14. The image forming apparatus according to claim 13, further comprising a recording medium supplying unit that supplies recording medium to the image forming device, wherein the recording medium supplying unit is disposed on the one side where the hinge member is provided, and the hinge member comprises two hinge members, which are disposed on both ends of the recording medium supplying unit so as not to interfere with the recording medium supplying unit.

15. The image forming apparatus according to claim 14, wherein the lower body is divided into an upper part and a lower part, the upper part has the same size as the upper body as to a lengthwise direction, a stepping portion is formed between the upper part and the lower part of the lower body, and the lower part is shorter than the upper part as to the lengthwise direction.

16. The image forming apparatus according to claim 13, wherein a part of the image forming device to be fixed to the lower body includes a recess at an upper portion thereof and the cartridge is placed in an appropriate position within the recess.

17. The image forming apparatus according to claim 16, wherein the cartridge accommodates a transfer unit.

18. The image forming apparatus according to claim 13, further comprising a tray that holds the recording medium, wherein the tray is disposed under the image forming device.

19. The image forming apparatus according to claim 13, further comprising a tray that holds the recording medium, wherein the tray is disposed above the image forming device.

20. An image forming apparatus, comprising:
a flat bed type image reading device;
an upper body that includes the image reading device;
an image forming device that includes a detachable cartridge;
a lower body that accommodates the image forming device and is disposed under the upper body;
a hinge member that connects the upper body and the lower body, the upper body being pivoted about the hinge member between an open position where the upper body is open with respect to the lower body and a close position where the upper body is closed with respect to the lower body, wherein when the upper body is pivoted towards the open position, a space between the upper body and the lower body is provided to allow the detachable cartridge to move in and out of the lower body, and the lower body is divided into an upper part and a lower part, the upper part has the same size as the upper body as to a lengthwise direction, a stepping portion is formed between the upper part and the lower part of the lower body, and the lower part is shorter than the upper part as to the lengthwise direction.

21. An image forming apparatus, comprising:
a flat bed type image reading device;
an upper body that includes the image reading device;
an image forming device that includes a detachable cartridge;
a lower body that accommodates the image forming device and is disposed under the upper body;
a hinge member that connects the upper body and the lower body, the upper body being pivoted about the hinge member between an open position where the upper body is open with respect to the lower body and a close position where the upper body is closed with respect to the lower body, wherein when the upper body is pivoted towards the open position, a space between the upper body and the lower body is provided to allow the detachable cartridge to move in and out of the lower body; and
a movable member that is provided in a side of the upper body and the lower body opposite to one side of the upper body and the lower body where the hinge member is provided, wherein the movable member moves together with the upper body, wherein when the upper body is pivoted towards the open position, the movable member moves downward to provide the space between the upper body and the movable member to allow the detachable cartridge to move in and out of the lower body.

22. An image forming apparatus, comprising:
a flat bed type image reading device;
an upper body that includes the image reading device;
an image forming device that includes a detachable cartridge;
a lower body that accommodates the image forming device and is disposed under the upper body; and
a hinge member that connects the upper body and the lower body, the upper body being pivoted about the hinge member between an open position where the upper body is open with respect to the lower body and a close position where the upper body is closed with respect to the lower body, wherein when the upper body is pivoted towards the open position, a space between the upper body and the lower body is provided to allow the detachable cartridge to move in and out of the lower body, the original document is placed parallel to the upper body as to the lengthwise direction, the recording medium is placed perpendicularly to the upper body as to the lengthwise direction, a sheet feed direction of the recording medium is perpendicular to a sheet feed direction of the original document, and the recording medium is discharged from the lower body with a recorded surface positioned facedown.

23. The image forming apparatus according to claim 22, wherein the hinge member is provided at one side of the upper body and the lower body so that the cartridge is detachable from a side opposite to the one side.

24. The image forming apparatus according to claim 23, further comprising a movable member that is provided in the side opposite to the one side where the hinge member is provided, the movable member moving together with the upper body, wherein when the upper body is pivoted toward the open position, the movable member moves downward to provide a space between the upper body and the movable member, and when the upper body is pivoted toward the close position, the movable member moves in between the upper body and the lower body and covers the space.

25. The image forming apparatus according to claim 24, wherein when the upper body is pivoted toward the open position, the movable member moves in a position to cover the fixing unit.

26. An image forming apparatus, comprising:
a flat bed type image reading device reads an image from an original document, as image data;
an upper body that includes the image reading device;
an image forming device, comprising:
a conveying unit that conveys a recording medium;
a light emitting unit that emits a light according to the image data read by the image reading device or data externally input;
a photosensitive member where an electrostatic latent image is formed by the light of the light emitting unit;
a developing unit that develops the electrostatic latent image formed on the photosensitive member as a visible image;
a transfer unit that transfers the visible image developed by the developing unit onto the recording medium;
a fixing unit that fixes the visible image transferred onto the recording medium by the transfer unit; and a detachable cartridge that accommodates at least the photosensitive member;

a lower body that accommodates the image forming device and is disposed under the upper body; and a hinge member that connects the upper body and the lower body, the upper body being pivoted about the hinge member between an open position where the upper body is open with respect to the lower body and a close position where the upper body is closed with respect to the lower body, wherein the transfer unit is disposed above the photosensitive member accommodated in the cartridge, the cartridge is detachable from the lower body via a space provided between the upper body and the lower body by pivoting the upper body toward the open position, the original document is placed parallel to the upper body as to the lengthwise direction, the recording medium is placed perpendicularly to the upper body as to the lengthwise direction, and a sheet feed direction of the recording medium is perpendicular to a sheet feed direction of the original document.

27. The image forming apparatus according to claim 26, wherein the hinge member is provided at one side of the upper body and the lower body so that the cartridge is detachable from a side opposite to the one side.

28. The image forming apparatus according to claim 27, further comprising a movable member that is provided in the side opposite to the one side where the hinge member is provided, the movable member moving together with the upper body, wherein when the upper body is pivoted toward the open position, the movable member moves downward to provide a space between the upper body and the movable member, and when the upper body is pivoted toward the close position, the movable member moves in between the upper body and the lower body and covers the space.

29. The image forming apparatus according to claim 28, wherein when the upper body is pivoted toward the open position, the movable member moves in a position to cover the fixing unit.

30. The image forming apparatus according to claim 26, wherein the light emitting unit is fixed to the lower body and the cartridge is disposed above the light emitting unit.

31. The image forming apparatus according to claim 26, wherein the sheet feed direction extends from a backside of the upper body to an opposing front side of the lower body.

32. The image forming apparatus according to claim 31, further comprising a sheet feed tray provided at the backside of the upper body.

33. The image forming apparatus according to claim 26, wherein the sheet feed direction extends from a backside of the lower body to an opposing front side of the lower body.

34. The image forming apparatus according to claim 33, further comprising a sheet feed tray provided in the lower body and below the cartridge.

* * * * *